United States Patent
Inbody (10) Patent No.: US 6,591,114 B1
(45) Date of Patent: Jul. 8, 2003

(54) FIXED CELLULAR COMMUNICATIONS SYSTEM

(75) Inventor: Jon E. Inbody, North Fort Myers, FL (US)

(73) Assignee: Qualicom Systems, Inc., Fort Myers, FL (US)

( * ) Notice: Subject to any disclaimer, the term of this patent is extended or adjusted under 35 U.S.C. 154(b) by 0 days.

(21) Appl. No.: 09/512,097

(22) Filed: Feb. 24, 2000

(51) Int. Cl.[7] .................................................. H04Q 7/20
(52) U.S. Cl. ........................ 455/554; 455/426; 455/520; 379/156; 379/230
(58) Field of Search ........................ 455/67.1, 74.1, 455/423, 424, 425, 426, 462, 463, 464, 465, 507, 509, 520, 554, 555, 567, 561; 379/156, 157, 230, 231, 232, 254

(56) References Cited

U.S. PATENT DOCUMENTS

| | | | | |
|---|---|---|---|---|
| 3,555,196 A | * | 1/1971 | Singer | 379/230 |
| 4,005,269 A | | 1/1977 | Willis | |
| 4,122,304 A | | 10/1978 | Mallien, II | |
| 4,220,820 A | | 9/1980 | Mallien, II | |
| 4,369,516 A | | 1/1983 | Byrns | |
| 4,538,029 A | | 8/1985 | Gazzoli et al. | |
| 4,616,314 A | | 10/1986 | Wilson et al. | |
| 4,654,655 A | | 3/1987 | Kowalski | |
| 4,658,096 A | | 4/1987 | West, Jr. et al. | |
| 4,718,080 A | | 1/1988 | Serrano et al. | |
| 4,737,975 A | | 4/1988 | Shafer | |
| 4,775,997 A | | 10/1988 | West, Jr. et al. | |
| 4,868,519 A | | 9/1989 | Shafer | |
| 4,922,517 A | | 5/1990 | West, Jr. et al. | |
| 4,959,851 A | | 9/1990 | Tobolski, Jr. et al. | |
| 5,046,085 A | | 9/1991 | Godsey et al. | |
| 5,117,450 A | | 5/1992 | Joglekar et al. | |
| 5,363,428 A | * | 11/1994 | Nagashima | 455/465 |
| 5,479,475 A | | 12/1995 | Grob et al. | |
| 5,483,576 A | | 1/1996 | Staples | |
| 5,487,175 A | | 1/1996 | Bayley et al. | |
| 5,526,399 A | | 6/1996 | Kameda | |
| 5,555,258 A | | 9/1996 | Snelling et al. | |
| 5,590,406 A | | 12/1996 | Bayley et al. | |
| 5,724,656 A | | 3/1998 | Vo et al. | |
| 5,751,789 A | | 5/1998 | Farris et al. | |
| 5,752,199 A | | 5/1998 | Scott | |
| 5,787,355 A | * | 7/1998 | Bannister et al. | 455/554 |
| 5,793,843 A | | 8/1998 | Morris | |
| 5,799,250 A | | 8/1998 | Veloso et al. | |
| 5,802,483 A | | 9/1998 | Morris | |
| 5,805,672 A | | 9/1998 | Barkat et al. | |
| 5,812,637 A | | 9/1998 | Schornack et al. | |
| 5,815,809 A | | 9/1998 | Ward et al. | |
| 5,864,763 A | | 1/1999 | Leung et al. | |
| 5,883,723 A | | 3/1999 | Sakata | |
| 5,884,179 A | | 3/1999 | Patel | |
| 5,884,191 A | | 3/1999 | Karpus et al. | |
| 5,892,816 A | | 4/1999 | Sih et al. | |

* cited by examiner

Primary Examiner—Nay Maung
(74) Attorney, Agent, or Firm—Cook, Alex, McFarron, Manzo, Cummings & Mehler, Ltd.

(57) ABSTRACT

A cellular interface unit is disclosed and is used in association with a trunk line of a private branch exchange or a key system unit. The cellular interface unit includes a cellular-type transceiver, a power supply and control circuitry. The cellular-type transceiver is used for mobile-to-mobile telephone calls with remote cellular telephone units and for mobile-to-landline telephone calls with remote landline telephone units. The control circuitry is used to convert signals between the cellular transceiver and the private branch exchange or key system unit so that the transceiver and its interconnected PBX or KSU function appropriately and so that use of the trunk line establishes a cellular telephone call, while resembling a landline telephone call through the PBX or KSU. Included within the control circuitry is call disconnection supervision circuitry that is responsive to the receipt of an end of call signal from the mobile telephone switching office. In response to the receipt of such signal, the call disconnection supervision circuitry causes the private branch exchange or key system unit to deactivate its associated trunk line and tear down the telephone call by monitoring a physical quantity attributable to the transceiver associated with the interface unit and responding to a change in that physical quantity. The power supply provides a source of electrical energy for the cellular transceiver and the control circuitry.

22 Claims, 6 Drawing Sheets

FIXED CELLULAR COMMUNICATIONS SYSTEM

BACKGROUND OF THE INVENTION

The present invention is generally directed to a telecommunication network and, more particularly, to a fixed cellular communications system that incorporates the use of a private branch exchange (PBX) or key system.

The use of telecommunication networks for business and personal purposes is typically regarded as a necessity of modern living. Use of these networks has increased exponentially over the past few decades. Today, telecommunication networks include, among other things, two major types of conventional telephone systems.

The first of these two conventional telephone systems shall be referred to herein as a landline telephone system. Landline telephone systems are the conventional wire-based systems that are found in most homes or businesses. Because these systems are wirebased, to develop such systems, the telephone service provider must acquire rights of way and establish a network infrastructure, which are costly endeavors. These telephone systems are typically regarded as being fixed in that the mobility of a telephone set connected to the system is limited to a relatively short range.

The second of these two conventional telephone systems shall be referred to herein as a cellular telephone system. Cellular telephone systems are the conventional wireless systems that have become increasingly popular among telephone service subscribers. The primary advantage of using these systems is that they permit mobility of the telephone handset, which allows the user to be reached even when he is located away from the home or office. The telephone handsets for cellular telephone systems are typically either connected to a cellular transceiver unit mounted in the trunk of an automobile or are portable, hand-held units that include a cellular transceiver in a common housing and can travel with a subscriber in his or her pocket or bag.

While the popularity of cellular telephone systems has increased, the expense associated with the use of such systems has steadily decreased, particularly when taking into account the standard rate of inflation. The use of cellular systems, however, is still generally more expensive than the use of conventional landline telephone systems. Cellular service providers, which often are not associated and/or affiliated with landline service providers, could establish and market billing plans that provide incentives for telephone subscribers to place mobile-to-mobile (cellular-to-cellular) telephone calls as opposed to mobile-to-landline and/or landline-to-mobile telephone calls. In many cases, the cost for a cellular-to-cellular call is priced at only about twenty-five percent (25%) of the cost for a similar cellular-to-landline call. The cost of mobile-to-mobile calls is less expensive because it is unnecessary to route such calls through the central office of a landline telephone service provider. Accordingly, the landline service provider does not charge the cellular service provider a service fee for utilizing its central office. To the contrary, mobile-to-landline and/or landline-to-mobile telephone calls are routed through the central office of a landline service provider, which charges a service fee for utilization of its central office. That fee is ultimately passed through and billed to the cellular telephone service subscriber.

In today's marketplace, many firms conduct business by having some employees at a main office and having other employees in motor vehicles out in the field who travel from work site to work site. For present purposes, those employees out in the field will be referred to as "mobile employees" and those employees in the main office will be referred to as "fixed employees".

One example of such a firm is a cable television company. Typically, cable television companies employ servicemen or technicians who drive to a job site, perform a service (such as installation or repair of cable television service at that site) and then drive to the next job site. These servicemen are mobile employees.

In other examples, some firms have employees who continually roam. For instance, with respect to a taxi cab service company, drivers (mobile employees) travel from location to location in order to transport passengers, while dispatchers (fixed employees) remain at the firm's main office and communicate with the drivers. The drivers do not actually stop at a work site to perform a job. Rather, they pick up passengers and transport them to a requested site. It will be appreciated that these examples are nowhere near exhaustive of the firms that have both mobile and fixed employees. It will further be appreciated that in the vast majority of these firms the mobile employees contact fixed employees working at the main office several times during each working day, and vice versa.

In these firms, it is impractical for the mobile employees to stop what they are doing each and every time they desire to place a telephone call to a fixed employee at the firm's office. In particular, for each time a mobile employee is required to contact a fixed employee at the firm's office, it would take too long and be too disruptive for the mobile employee to drive his/her motor vehicle off the road, park the vehicle, exit from its passenger compartment, approach a coin-actuated telephone, insert the appropriate currency, and dial the office telephone number. Further, it is beneficial if the mobile employees can be reached easily at any time. Accordingly, use of a wireless form of communication by mobile employees provides significant benefits, some of which are noted above. A cellular telephone with transceiver is typically the most practical and desirable form of communication.

Given the billing plans offered by many cellular telephone providers, where cellular-to-cellular calls can be completed for a cost substantially less than the cost of similar cellular-to-landline calls, if a firm's mobile employees use cellular transceivers to place outgoing and receive incoming telephone calls, it makes sense for the fixed employees to communicate with the mobile employees by using cellular transceivers as well. In that way, the firm's overhead and operating costs can be reduced.

In prior art telephone systems, it is known to use a fixed cellular communications system to provide for mobile-to-mobile calls. An example of a fixed cellular communications system can be found in U.S. Pat. No. 4,922,517, issued to West, Jr. et al., the disclosure of which is hereby incorporated herein by reference. Fixed cellular communications systems typically incorporate an interface unit that encodes signals received from a landline telephone unit and decodes signals received from a remote cellular telephone unit. These interface units typically include, among other possible things, a cellular transceiver, logic circuitry and a power supply. The interface unit, when combined with the landline telephone unit, permits the landline telephone unit to function as if it were a cellular telephone unit. Under such circumstances, outgoing calls transmitted to a remote cellular telephone unit and incoming calls received from a remote cellular telephone unit are made on a mobile-to-mobile basis.

In light of these prior art fixed cellular communication systems, business firms could incorporate a landline telephone unit and an interface unit for every fixed employee so that calls made to and received from the mobile employees would be made on a mobile 10 to-mobile basis and the firm could take advantage of any applicable cost effective billing plans. Use of an external telephone line for every fixed employee, however, is impractical, especially for those business firms that have a relatively large number of fixed employees.

It will be appreciated that business firms often employ a private branch exchange (PBX) and/or a key system unit (KSU) for their telephone service. These systems allow for the switching of calls between the fixed employees on local lines, while simultaneously allowing the fixed employees to share external lines (known as trunk lines). The primary purpose of these systems is to save the additional cost that would otherwise be associated with requiring an outside telephone line for each fixed employee. For purposes herein, the words "private branch exchange" and/or the initials "PBX" shall be interpreted to mean both a private branch exchange and a key system unit. Accordingly, those words and/or initials, when used in the appended claims, shall cover both types of systems literally.

Those business firms that use a PBX or KSU for their telephone service could try to employ the interface units of the prior art in those systems to establish a fixed cellular communications system. What those firms would discover, however, is that using the prior art interface units with PBX and/or KSU systems creates several unforeseen problems. Among other things, no call teardown occurs when calls are terminated by the remote cellular telephone unit. As such, the prior art interface units have not, until now, been designed to function properly when used in association with a PBX and/or KSU.

As is well known in the art, in cellular telephone systems, upon completion of a mobile-to-mobile call between two cellular telephones whose users subscribe to cellular service offered by the sane cellular service provider, one unit terminates the call by transmitting an appropriate end of call (EOC) signal to the mobile telephone switching office (MTSO) utilized by the cellular telephone service provider. The MTSO receives the EOC signal from that unit and either relays that end of call (EOC) signal to the other cellular unit or generates another end of call (EOC) signal for transmission to the other cellular unit. With respect to fixed cellular communications systems, the cellular transceiver included as part of the interface unit either receives an EOC signal (when the call is terminated at the remote unit) or, alternatively, transmits an EOC signal (when the call is terminated at the landline telephone unit associated with the interface unit).

When the call is terminated at the remote unit, which is often the case, the prior art interface units typically do not cooperate with the functionality of PBX and/or KSU systems. In particular, when the cellular transceiver included as part of the interface unit receives an EOC signal from the MTSO, it responds by powering down. Nothing else notable occurs. As a result, the trunk line used for the call within the PBX and/or KSU system remains activated. From the standpoint of the PBX and/or KSU system, the call is never terminated, and the trunk line is never released, thereby rendering it useless.

In light of the foregoing, it is desirable to design a fixed cellular communications system for use with a trunk line of a private branch exchange and/or key system unit.

It is also desirable to design a fixed cellular communications system that effectuates call teardown when used in association with a trunk line of a private branch exchange and/or key system unit.

It is further desirable to design an interface unit for a fixed cellular communications system, wherein the interface unit causes its associated trunk line to be released upon termination of a telephone call at a remote telephone unit.

It is yet further desirable to design a fixed cellular communications system that includes call disconnection supervision control circuitry for use in association with a trunk line of a private branch exchange and/or key system unit.

It is still further desirable to design such a system that includes call disconnection supervision control circuitry that monitors a physical quantity attributable to its associated cellular transceiver and responds to a transition in the value of that physical quantity by causing its electrically coupled trunk line to be released.

These and other objects of the preferred form of the invention will become apparent from the following description. It will be understood, however, that an apparatus could appropriate the invention claimed herein without accomplishing each and every one of these objects, including those gleaned from the following description. The appended claims, not the objects, define the subject matter of this invention. Any and all objects are derived from the preferred form of the invention, not the invention in general.

SUMMARY OF THE INVENTION

The present invention is directed to a cellular interface unit for use in association with a trunk line of a private branch exchange or a key system unit. The cellular interface unit includes a cellular-type transceiver, a power supply and control circuitry. The cellular-type transceiver is used for mobile-to-mobile telephone calls with remote cellular telephone units and for mobile-to-landline telephone calls with remote landline telephone units. The control circuitry is used to convert signals between the cellular transceiver and the private branch exchange or key system unit so that the transceiver and its interconnected PBX or KSU function appropriately and so that use of the trunk line establishes a cellular telephone call, while resembling a landline telephone call through the PBX or KSU. Included within the control circuitry is call disconnection supervision circuitry that is responsive to the receipt of an end of call signal from the mobile telephone switching office. In response to the receipt of such signal, the call disconnection supervision circuitry causes the private branch exchange or key system unit to deactivate its associated trunk line and tear down the telephone call by monitoring a physical quantity attributable to the transceiver associated with the interface unit and responding to a change in that physical quantity. The power supply provides a source of electrical energy for the cellular transceiver and the control circuitry.

BRIEF DESCRIPTION OF THE DRAWINGS

In the following detailed description, reference will frequently be made to the following drawings, in which like reference numerals refer to like components, and in which.

DETAILED DESCRIPTION OF THE PREFERRED EMBODIMENT

Figure 1:
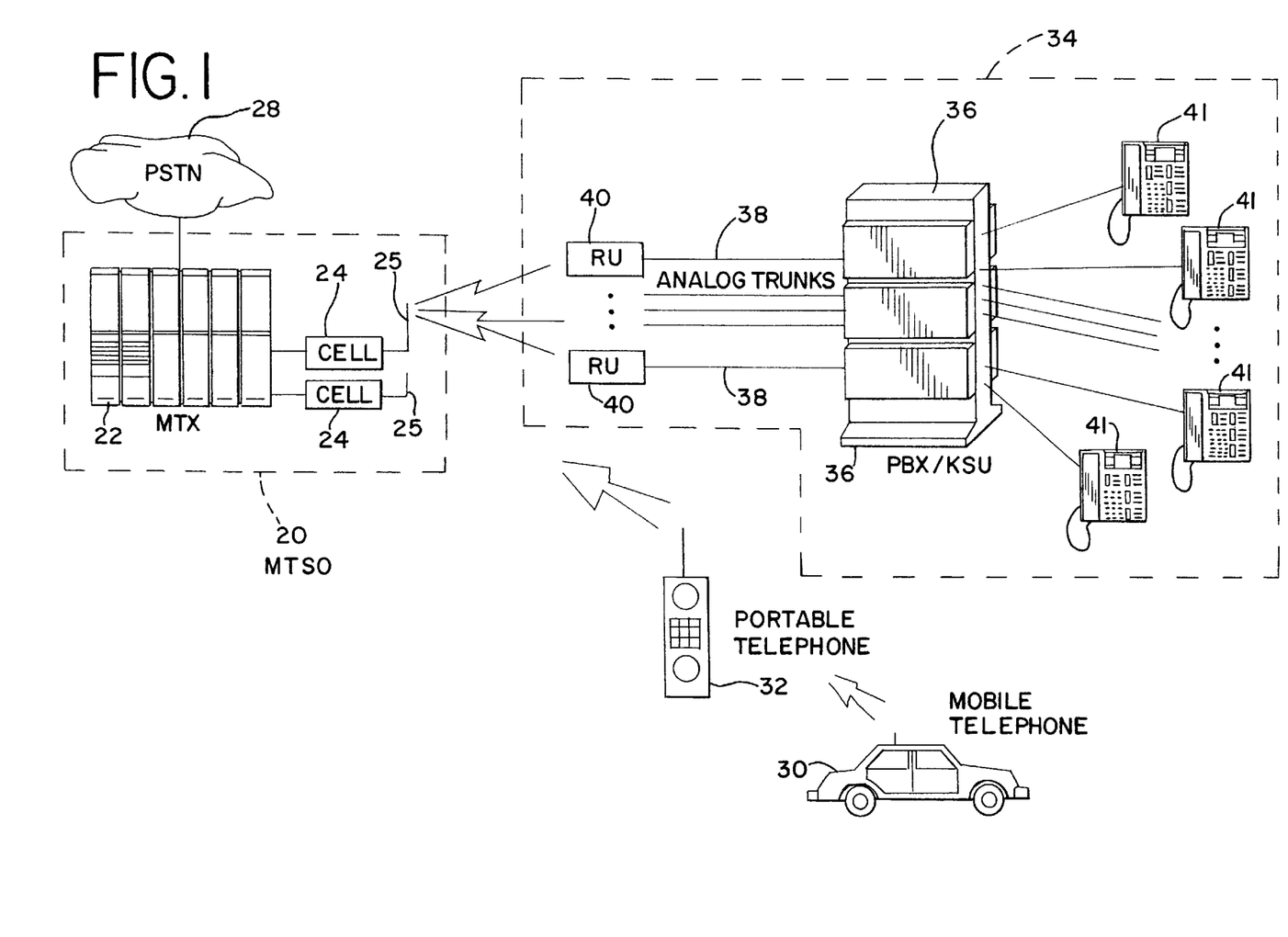
FIG. 1 is a diagram illustrating a telecommunication network and specifically illustrating a fixed cellular communications system constructed in accordance with the principles of the present invention.

FIG. 1 illustrates a mobile telephone switching office (MTSO) 20, which in accordance with conventional design, includes a mobile telephone switch (MTX) 22 and cells 24, each having a radio frequency (RF) antenna 25 associated therewith. MTSO 20 is interconnected with a public switched telephone network (PSTN) 28 to allow for the routing of telephone calls to and from the PSTN. MTSO 20 is further interfaced with mobile telephones 30 and portable telephones 32, and communication occurs through cells 24.

As further shown in FIG. 1, a fixed cellular communications system 34 includes a private branch exchange (PBX) (or a key system unit (KSU)) 36 having a plurality of analog trunk lines 38 connected thereto. The trunk lines 38 are connected, in turn, to interface units 40. Each trunk line 38 has an interface unit 40 associated therewith. Fixed cellular communications system 34 further includes a plurality of key sets (i.e., business telephones) 41, which are connected to PBX/KSU 36.

In operation, telephone calls are placed from key sets 41 by depressing a line key to activate the analog trunk line 38 associated with that line key. Thereafter, a dial tone is emulated by the control circuit included within the interface unit 40 associated with the activated trunk line 38. Upon recognition of the emulated dial tone, the telephone user then dials the desired telephone number and the call is placed in accordance with the protocol of the selected interface unit 40.

Figure 3:
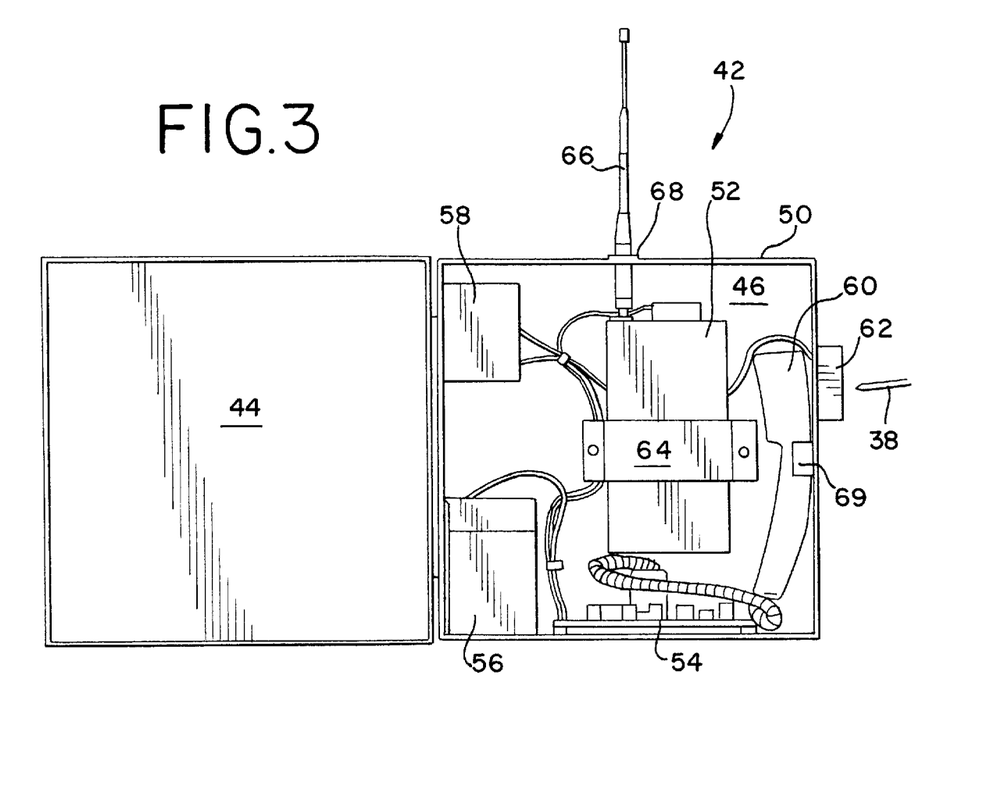
FIG. 3 is a front view of the housing depicted in FIG. 2, wherein the front panel has been opened to show the components included within its interior.

As will be appreciated, the placed call is made from a cellular transceiver included as part of the interface unit 40 (see FIG. 3). The call is routed through the MTSO 20. In the case where the telephone call is made to a mobile telephone 30 or a portable telephone 32, the call is made on a mobile-to-mobile basis. As a result, if both the called and calling parties subscribe to cellular service offered by the same mobile telephone service provider, all switching would only need to be performed by that service provider. This could result in substantial savings for the customers, and the mobile service provider could introduce and market corresponding billing plans. Most importantly, in this case, costs associated with switching by a different mobile service provider and/or a landline service provider would not be incurred, as those providers would not need to route the placed call. It will be appreciated that, referring to FIG. 1, the switching offices for different mobile service providers and for landline service providers are included as part of the PSTN 28.

When a call is placed to a "fixed employee" whose office uses a fixed cellular communications system 34 for its telephone service, one of the analog trunks 38 is activated in accordance with the applicable protocol (e.g., hunt-and-seek). The call is received at the cellular transceiver included as part of the interface unit 40 associated with that activated trunk. If the call has been placed by a mobile or portable telephone user who subscribes to the same mobile service provider as the firm that utilizes the fixed cellular communications system 34, then the call need only be routed through the mobile switching office 20 for that service provider, and is made on a mobile-to-mobile basis. Again, savings are then possible.

Figure 2:
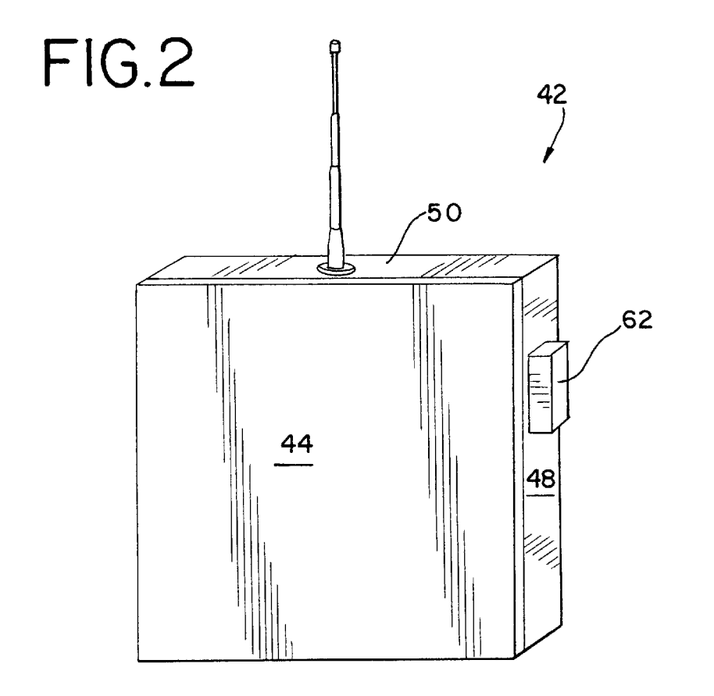
FIG. 2 is a front perspective view of a housing for the components of an interface unit of the type preferably used in the fixed cellular communications system depicted in FIG. 1.

FIG. 2 illustrates a preferred housing 42 for the interface unit 40 of the type used in the fixed cellular communications system 34 depicted in FIG. 1. Housing 42 is preferably, though not necessarily, constructed in metal. As shown, the housing 42 includes a front panel 44, a rear panel 46 (see FIG. 3), a side panel 48 and a top panel 50. Not shown but also included as part of the housing 42 are a side panel opposite side panel 48 and a bottom panel.

Referring to FIG. 3, the front panel 44 of housing 42 is shown in its open position. Preferably, front panel 44 is pivotally connected to one of the side panels of the housing, most preferably by one or more hinges. As shown, the interface unit 40 preferably includes a cellular transceiver 52 for transmitting and receiving cellular telephone calls. Interface unit 40 further includes a circuit board 54 on which control circuitry, including disconnection supervision/call termination control circuitry, is mounted. Unit 40 also includes a data adapter 56 of the type found in prior art fixed cellular communications systems. Data adapter 56 houses control circuitry that emulates standard telephone service (POTS) for cellular transceiver 52 and further emulates control signals for the transceiver. It will be appreciated that the control circuitry mounted on circuit board 54 could be included as part of the control circuitry housed within data adapter 56 and share a common housing therewith. The interface unit 40 further includes a power supply 58, a programming handset 60 and a modular telephone jack 62.

Cellular transceiver 52 is preferably mounted to the rear panel 46 of housing 42 with the aid of amounting bracket 64 fastened to that panel. The cellular transceiver 52 includes a radio frequency antenna 66 mounted thereto, which antenna extends through a port 68 included within the top panel 50 of housing 42 to facilitate transmission and reception of cellular telephone calls through one of the cells 24 operating at the mobile telephone switching office 20 (FIG. 1).

Cellular transceiver 52 is electrically coupled to the control circuitry mounted on circuit board 54 and the control circuitry housed within data adapter 56. The control circuitry is electrically coupled to the modular telephone jack 62, which is designed to receive a particular one of the trunk lines 38 included within the fixed cellular communications system 34 depicted in FIG. 1. In this configuration, the control circuitry interfaces between the cellular transceiver 52 and an analog trunk line 38 for the fixed cellular communications system 34.

Power supply 58 is electrically coupled to the control circuitry mounted on circuit board 54, to the control circuitry housed within data adapter 56, and to the cellular transceiver 52. So coupled, power supply 58 serves as a source of electrical energy for all control circuitry and the circuitry included in cellular transceiver 52.

Programming handset 60 is electrically coupled to the cellular transceiver 52 and allows for a variety of functions to be programmed for use with the interface unit 40 generally, and the transceiver 52 specifically. One example of such programming is that the telephone number associated with cellular transceiver 52 can be changed through use of programming handset. When not being used, programming handset 60 is preferably held in place by a mounting bracket 69 mounted to side panel 48 of housing 42.

Figure 4:
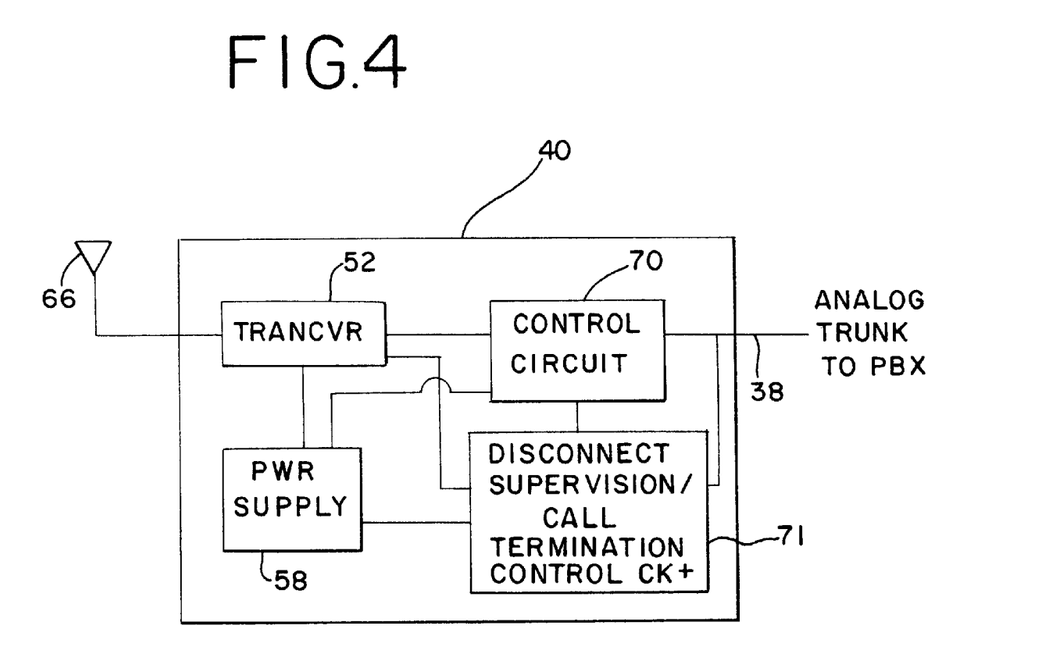
FIG. 4 is a block diagram of the components included within the interface unit depicted in FIG. 3.

Referring to FIG. 4, a schematic diagram for interface unit 40 is shown. As shown, interface unit 40 includes transceiver 52, which receives and transmits RF signals through antenna 66. Control circuit 70 housed within data adapter 56 is connected to transceiver 52, at one side, and to the analog trunk line 38 associated with interface unit 40, at the other side. In that regard, the control circuitry preferably includes a trunk driver circuit. Disconnect supervision/call termination control circuitry 71, which is mounted on circuit board 54, is also connected to transceiver 52 and trunk line 38, as shown. Power supply 58 is connected to transceiver 52, control circuit 70 and disconnect supervision/call termination control circuitry 71, as necessary, to provide a source of electrical energy for carrying out the functions of those circuits.

Figure 5:
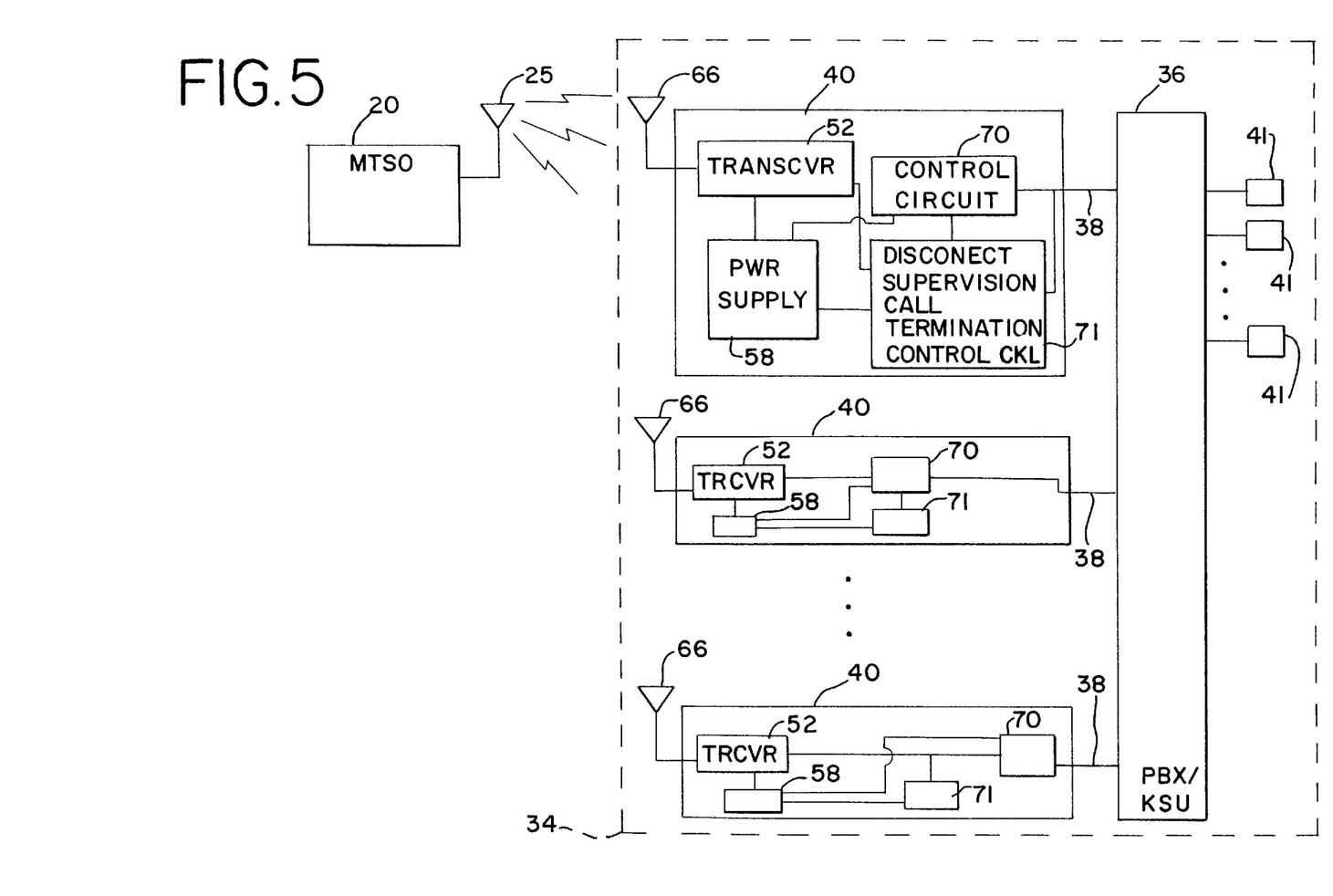
FIG. 5 is another block diagram illustrating a fixed cellular communications system constructed in accordance with the principles of the present invention.

An important aspect of this invention is the incorporation of the disconnect supervision/call termination circuitry 71 shown in FIG. 4. Referring to FIG. 5, the interface unit 40, which includes that circuitry, is shown (much like in FIG. 1) as being part of a fixed cellular communications system 34 used in a telecommunication network. Private branch exchange (PBX) 36 has a plurality of key sets 41 connected thereto. PBX 36 is connected to a plurality of analog trunk lines 38 and each such trunk line has an associated interface unit 40 connected thereto. The transceiver 52 included within each interface unit 40 is capable of transmitting and receiving radio frequency signals through antenna 66 of the interface unit to an antenna 25 associated with the mobile telephone switching office 20 of a mobile telephone service provider. For calls placed to or from mobile and/or portable telephones 30, 32 (see FIG. 1) having users who subscribe to the same service subscriber as the firm controlling the fixed cellular communications system 34, calls need only be routed through mobile telephone switching offices 20 under the control of the mobile telephone service provider. As a result, the cost associated with placing and/or receiving such calls will typically be less than when an outside provider's office must be utilized to route the call (be it a central telephone office or a mobile telephone switching office controlled by a different provider).

Figure 6:
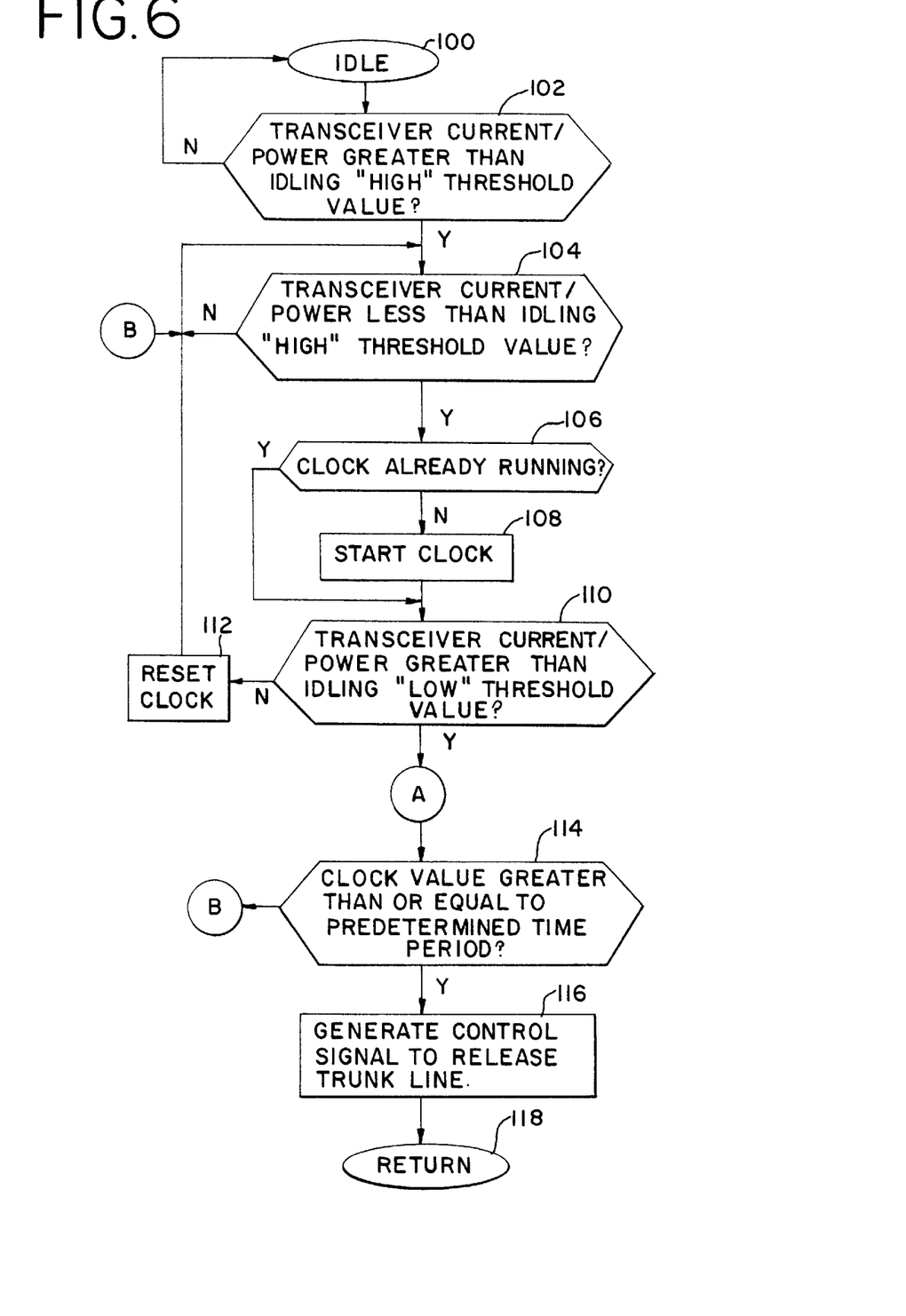
FIG. 6 is a flowchart diagram illustrating the functions performed by the disconnect supervision/call termination control circuitry included within the fixed cellular communications system of the present invention.

The operation and functionality of the disconnect supervision/call termination circuitry 71 is represented in the flowchart diagram illustrated in FIG. 6. When a call is terminated by a remote cellular telephone (such as mobile telephone 30 and/or portable telephone 32 shown in FIG. 1), an appropriate end-of-call (EOC) signal is generated by that remote telephone and is transmitted to switching office 20. Switching office 20 receives the EOC signal and, in response thereto, transmits a call end control signal to transceiver 52. The call end control signal may be, but need not be, identical to the EOC signal.

In response to its receipt of the call end control signal, the transceiver 52, which was activated and therefore previously drawing relatively high current and consuming relatively high energy, "powers down" to its idle state. It will be appreciated that cellular transceiver 52 consumes more energy during a call, as opposed to during any given time interval while it is idling.

The disconnect supervision/call termination circuitry 71 constantly monitors the current drawn and/or the energy consumed by transceiver 52. When the absolute value associated with the monitored one of those physical quantities moves from a state wherein it is greater than an idling "high" threshold value to a state wherein it is less than the idling "high" threshold value for a predetermined period of time, and for so long as it remains less than an idling "low" threshold value for that predetermined period of time, the disconnect supervision/call termination circuitry 71 senses this transition and causes the previously activated/seized trunk line 38 to be released. In effect, once the absolute value of the selected physical quantity moves into and remains within an idling "window" for a predetermined period of time, the trunk line 38 associated with the interface unit 40 is caused to be released by the disconnect supervision/call termination circuitry 71. In its preferred form, the aforementioned period of time is approximately five hundred milliseconds (500 ms).

In particular, referring to FIG. 6, block 100 represents the state wherein the cellular transceiver is idling. Block 102 is a step wherein the disconnect supervision/call termination circuitry 71 determines whether the physical quantity being monitored (e.g., current and/or power) is greater than the idling "high" threshold value. If not, it is determined that the transceiver is idling, or is powered off. If so, it is recognized that the transceiver is in operation.

At block 104, the disconnect supervision/call termination circuitry 71 determines whether the physical quantity being monitored has shifted such that it is now less than the idling "high" threshold value. If not, operation loops back to block 104 and the disconnect supervision/call termination circuitry 71 awaits a transition of the physical quantity being monitored from a condition where it is greater than the idling "high" threshold value to a condition where it is less than that idling "high" threshold value.

Once this transition occurs, it is then determined, at block 106, whether the clock has already been triggered. If not, the clock is triggered, as represented by block 108. In any event, at block 110, the disconnect supervision/call termination circuitry 71 then determines whether the physical quantity being monitored is greater than the idling "low" threshold value. If not, the clock is reset at block 112 and the process reverts back to the operation depicted by block 104.

If the disconnect supervision/call termination circuitry 71 determines that the physical quantity being monitored is greater than idling "low" threshold value, then operation continues to block 114 and it is determined whether the clock has reached its predetermined value such that the physical quantity being monitored has stayed within the applicable idling "window" for such predetermined period of time. If not, operation reverts back to the operation depicted by block 104. If so, the disconnect supervision/call termination circuitry 71 generates a control signal to release the trunk line, as shown by block 116. The process is then resumed, as shown by block 118.

It will be appreciated that the process illustrated in FIG. 6 is merely illustrative of the functions that are performed by the disconnect supervision/call termination circuitry 71.

It will be appreciated by those skilled in the art that each transceiver 52 has its own corresponding idling level. Accordingly, the idling level of the physical quantity selected to be monitored will need to be measured before the interface unit is put in use. A conventional meter can be used for that purpose. The "high" and "low" threshold levels that bound the threshold "window" can then be set so that the disconnect supervision/call termination circuitry 71 is calibrated and functions properly for the transceiver in which it is used in conjunction.

It will be appreciated that the disconnect supervision/call termination circuitry 71 will not be needed to release its associated trunk line 38 when the call is terminated by a fixed cellular communications system user (e.g., a user of one of the key sets 41 shown in FIG. 5). Upon termination of the call at a key set 41, the active trunk line 38 is released and, in response thereto, the control circuit 70 causes the transceiver 52 to generate and transmit an EOC signal to the MTSO 20. Thereafter, the transceiver "powers down" to its idling state. In response to the received EOC signal from transceiver 52, the MTSO 20 signals the remote telephone (be it landline or cellular) to disconnect so that appropriate call tear down occurs at that remote telephone.

Figure 7:
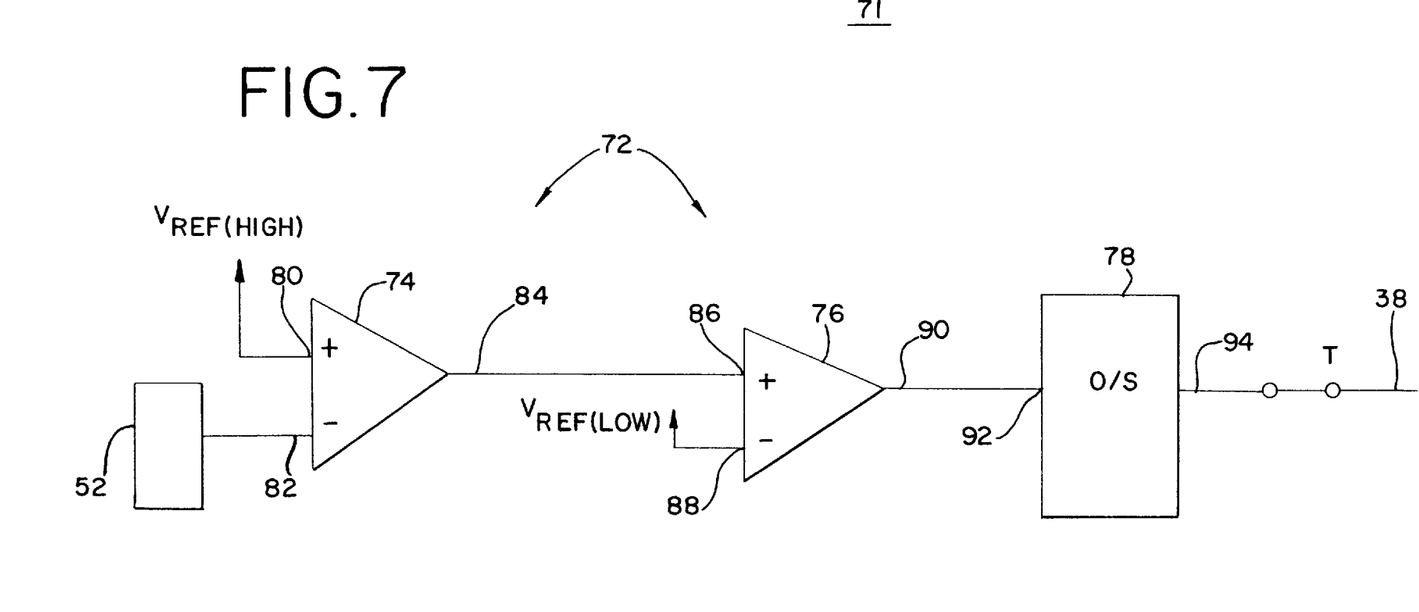
FIG. 7 is a circuit schematic diagram illustrating analog electronic components that can be included within the disconnect supervision/call termination control circuitry of the interface unit depicted in block diagram form in FIG. 4.

Referring to FIG. 7, basic analog circuit components that can be utilized to perform the preferred functions of disconnect supervision/call termination circuitry 71 are shown. The disconnect supervision/call termination circuitry 71 includes a window comparator 72, preferably including two operational amplifiers 74, 76, and a one-shot device 78. The noninverting input terminal 80 of operational amplifier 74 is set to a voltage level that corresponds to the high end boundary of the idling threshold window for the physical quantity being monitored. It will be appreciated that this voltage level is not necessarily, and preferably is not, equal to the high end boundary of the defined idling threshold window. It will also be appreciated that this voltage level can preferably be altered for use with different transceivers, which, in turn, are likely to have different idling conditions. To effectuate such alteration, a voltage ladder network having a variable resistor could be used. It will be appreciated that other manners in which to effectuate such alteration could also be used.

The inverting terminal 82 of operational amplifier 74 is preferably electrically coupled to the transceiver 52. The output 84 of amplifier 74 is electrically coupled to the noninverting terminal 86 of operational amplifier 76. The inverting terminal 88 of operational amplifier 76 is set to a voltage level that corresponds to the low end boundary of the idling threshold window for the physical quantity being monitored. It will be appreciated that this voltage level is not necessarily, and preferably is not, equal to the low end boundary of the defined idling threshold window. Also, it will be appreciated that this voltage level can preferably be altered.

The output 90 of operational amplifier 76 is electrically coupled to the input terminal 92 of one-shot device 78 and the output terminal 94 of the one-shot device is electrically coupled to the tip terminal (T) of the trunk line 38 associated with the interface unit 40.

In operation, during a call, transceiver 52 is drawing sufficiently high current and/or consuming sufficiently high energy such that the voltage level present at the inverting terminal 82 of operational amplifier 74 exceeds the voltage level present at the noninverting input terminal 80 of that op amp. As a result, operational amplifier 74 is disabled, which causes the voltage level at its output terminal 84 (and at the noninverting input terminal 86 of operational amplifier 76) to be driven LOW. This renders operational amplifier 76 inactive also.

Upon termination of the call by a remote telephone, the transceiver, in response to a signal received from the MTSO 20 (FIG. 1), "powers down" and the voltage level at the inverting terminal 82 of operational amplifier 74 falls below the voltage level present at the noninverting input terminal 80 of that op amp. Accordingly, operational amplifier 74 is enabled and the voltage level present at its output terminal 84 is driven HIGH. This voltage level, which is also present at the noninverting input terminal 86 of operational amplifier 76, exceeds the voltage level present at the inverting input terminal 88 of that op amp, causing that op amp to be enabled. As a result, the input terminal 92 of one shot device 78 is pulsed with a voltage signal. If the voltage signal present at the input terminal 92 of one shot device 78 remains HIGH for a sufficiently long period of time, the output terminal 94 of that device goes HIGH and "lengthens" that pulse so that trunk line 38, to which it is electrically coupled, is released. It will be appreciated that an electronic latch or similar device might also be included to aid in the performance of these functions.

As will be appreciated, the idling "window" is set by the voltage levels present at the inputs of the operational amplifiers 74, 76 of window comparator 72. It will also be appreciated that the timing is set by the characteristics of one shot device 78.

Those skilled in the art will also appreciate that the disconnect supervision/call termination circuitry 71 can alternatively be embodied in a variety of other manners, including with digital electronic circuit components and/or a microprocessor programmed to perform the aforementioned functions of the disconnect supervision/call termination circuit.

While this invention has been described with reference to an illustrative embodiment, it will be understood that this description shall not be construed in a limiting sense. Rather, various changes and modifications can be made to the illustrative embodiment without departing from the true spirit and scope of the invention, as defined by the following claims. Furthermore, it will be appreciated that any such changes and modifications would be recognized by those skilled in the art as an equivalent to one element or more of the following claims, and shall be covered by such claims to the fullest extent permitted by law.

I claim:

1. A cellular interface unit for use in association with a trunk line of a private branch exchange, comprising:
   a transceiver;
   a power supply electrically coupled to the transceiver;
   control circuitry electrically coupled to the transceiver and the trunk line, said control circuitry being an interface between said transceiver and said trunk line; and
   call disconnection supervision circuitry coupled to said transceiver and responsive to a predetermined change in a physical quantity attributable to said transceiver, said call disconnection supervision circuitry causing said trunk line to be deactivated upon said predetermined change in said physical quantity.

2. The cellular interface unit as defined by claim 1 wherein said predetermined change of said physical quantity is based on a change of said physical quantity from an operative state indicative of said transceiver being in an operating mode to an inoperative state indicative of said transceiver being in a standby mode.

3. The cellular interface unit as defined by claim 2 wherein said inoperative state of said physical quantity exists when said physical quantity has a value associated therewith that is within a window defined as including values between a high threshold value and a low threshold value.

4. The cellular interface unit as defined by claim 3 wherein said call disconnection circuitry is responsive to said physical quantity value being within said window for a predetermined period of time.

5. The cellular interface unit as defined by claim 4 wherein said predetermined period of time is approximately five hundred milliseconds.

6. The cellular interface unit as defined by claim 1 wherein said physical quantity is operating current of said transceiver.

7. The cellular interface unit as defined by claim 1 wherein said physical quantity is power consumed by said transceiver.

8. The cellular interface unit as defined by claim 1 wherein said call disconnection supervision circuitry comprises a window comparator circuit.

9. The cellular interface unit as defined by claim 8 wherein said window comparator circuit comprises a first operational amplifier and a second operational amplifier electrically coupled to the first operational amplifier.

10. The cellular interface unit as defined by claim 9 wherein said first operational amplifier comprises:
    an inverting terminal electrically coupled to said transceiver;
    a noninverting terminal electrically coupled to a first reference electrical energy source; and
    an output terminal;
wherein said second operational amplifier comprises:
    an inverting terminal electrically coupled to a second reference electrical energy source;
    a noninverting terminal electrically coupled to the output terminal of said first operational amplifier; and
    an output terminal; and
wherein said call disconnection supervision circuit further comprises:
    a one-shot device having an input terminal electrically coupled to the output terminal of said second operational amplifer, and an output terminal electrically coupled to said trunk line.

11. A fixed cellular communications system, comprising:
    a private branch exchange;
    a key set electrically coupled to the private branch exchange;
    a trunk line electrically coupled to the private branch exchange;
    a cellular interface unit electrically coupled to the trunk line, the cellular interface unit comprising:
        a transceiver;
        a power supply electrically coupled to the transceiver;
        control circuitry electrically coupled to the transceiver and the trunk line, said control circuitry being an interface between said transceiver and said trunk line; and
        call disconnection supervision circuitry coupled to said transceiver and responsive to a predetermined change in a physical quantity attributable to said transceiver, said call disconnection supervision circuitry causing said trunk line to be deactivated upon said predetermined change in said physical quantity;
    a mobile telephone switching office in electrical communication with the transceiver of said cellular interface unit; and
    a mobile transceiver in electrical communication with said mobile telephone switching office.

12. The fixed cellular communications system as defined by claim 11 wherein said private branch exchange is a key system unit.

13. The cellular interface unit as defined by claim 11 wherein said predetermined change of said physical quantity is based on a change of said physical quantity from an operative state indicative of said transceiver being in an operating mode to an inoperative state indicative of said transceiver being in a standby mode.

14. The cellular interface unit as defined by claim 13 wherein said inoperative state of said physical quantity exists when said physical quantity has a value associated therewith that is within a window defined as including values between a high threshold value and a low threshold value.

15. The cellular interface unit as defined by claim 14 wherein said call disconnection circuitry is responsive to said physical quantity value being within said window for a predetermined period of time.

16. The cellular interface unit as defined by claim 15 wherein said predetermined period of time is approximately five hundred milliseconds.

17. The cellular interface unit as defined by claim 11 wherein said physical quantity is operating current of said transceiver.

18. The cellular interface unit as defined by claim 11 wherein said physical quantity is power consumed by said transceiver.

19. The cellular interface unit as defined by claim 11 wherein said call disconnection supervision circuitry comprises a window comparator circuit.

20. The cellular interface unit as defined by claim 19 wherein said window comparator circuit comprises a first operational amplifier and a second operational amplifier electrically coupled to the first operational amplifier.

21. The cellular interface unit as defined by claim 20 wherein said first operational amplifier comprises:
    an inverting terminal electrically coupled to said transceiver;
    a noninverting terminal electrically coupled to a first reference electrical energy source; and
    an output terminal;
wherein said second operational amplifier comprises:
    an inverting terminal electrically coupled to a second reference electrical energy source;
    a noninverting terminal electrically coupled to the output terminal of said first operational amplifier; and
    an output terminal; and
wherein said call disconnection supervision circuit further comprises:
    a one-shot device having an input terminal electrically coupled to the output terminal of said second operational amplifer, and an output terminal electrically coupled to said trunk line.

22. A method for using a cellular interface unit electrically coupled with a trunk line of a private branch exchange to control deactivation of said trunk line upon termination of a telephone call, comprising the steps of:
    providing a cellular interface unit having a transceiver, a power supply electrically coupled to the transceiver, and control circuitry electrically coupled to the transceiver;
    receiving at said transceiver a signal indicative of said termination of said telephone call;
    changing a physical quantity attributable to said transceiver in response to receipt of said signal;
    detecting said change of said physical quantity; and
    causing said trunk line to be deactivated in response to said detection of said change of said physical quantity.

* * * * *